Dec. 29, 1942.　　　A. S. VOLPIN　　　2,306,839
PLUG AND SEAT FOR VALVES
Filed April 22, 1940　　　2 Sheets-Sheet 1

A. S. VOLPIN.
INVENTOR.
Jesse R. Stone
Lester B. Clark
ATTORNEYS

Dec. 29, 1942.  A. S. VOLPIN  2,306,839
PLUG AND SEAT FOR VALVES
Filed April 22, 1940  2 Sheets-Sheet 2

A. S. VOLPIN
INVENTOR.
Jesse R. Stone
Lester B. Clark
ATTORNEYS

UNITED STATES PATENT OFFICE 2,306,839

PLUG AND SEAT FOR VALVES

Alexander S. Volpin, Houston, Tex., assignor to Mission Manufacturing Company, Houston, Tex.

Application April 22, 1940, Serial No. 330,831

6 Claims. (Cl. 251—101)

The invention relates to a particular construction of the plug member which is arranged to seat in the plug chamber in valves.

In plug valves where the plug is circular and is arranged to be turned or rotated in a circular chamber it is obvious that there must be a clearance or tolerance between the periphery of the plug and the circular seat so that the plug can be turned. The usual practice is to provide a circular bore or chamber and a circular plug of lesser diameter by twice the amount of the clearance, so that there will be a clearance on each side and each end of the plug member.

In view of the fact that the diameter of the plug is different than the diameter of the bore and also due to the fact that the passage which intercepts the bore and is to be closed by the plug is of substantial width, considerable difficulty has been encountered in attempting to maintain a seal between the plug and the circular seat at the entrance or exit of the passage. This is due to the fact that the plug being of lesser diameter has a periphery or side whose curvature is an arc of lesser diameter than the arc of the seat which it is to engage. In view of this difference in the curvature of the arc due to the lesser radius of the plug arc there is in reality only a line contact or bearing between the plug and the seat when under pressure.

This bearing will be along a vertical line coinciding with the longitudinal axis of the passage through the valve. As the arc of the plug and the arc of the seat depart from this line bearing to either side they gradually diverge, so that by the time the edges of the passage through the valve are reached there is an undesirable open space between the arc of the plug and the arc of the seat. Inasmuch as a seal should be maintained at the edges of the passage as well as at the top and bottom along the line bearing, difficulty has been encountered in maintaining a seal completely about the passage.

Where the valve is of the lubricated type the grease or lubricant introduced through the housing or through the plug to assist in maintaining a seal about the passage escapes due to the fact that the arcs diverge adjacent the edges of the passage.

The present invention contemplates an arrangement of the plug member so that the arcs of the plug and seat will fit precisely at least throughout that area which extends beyond the width of the passage by providing arcs on such plug and seat which are substantially identical. The precision of these arcs may be such as to accommodate only the lubricant which is to be utilized if any.

Another object is to provide a plug for plug valves which has a curved periphery so arranged that when the plug is moved laterally by pressure to engage the downstream seat that then the center of rotation of the plug and the centers upon which the arcs of the periphery of the plug and the seat about the passage in the housing will coincide.

It is one of the objects of the invention to provide a plug and seat for plug valves wherein the contacting arcs of the plug and the seat when the plug is in closed position will be identical arcs.

Another object of the invention is to provide a plug and seat for plug valves wherein the arc of the periphery of the plug which contacts the seat about the passage when the valve is in closed position is of the same radius as the arc of the seat.

Another object of the inveniton is to offset the centers of the radii by which the arcs of the sides of a plug member are struck, so that such arcs will merge toward the ends of the plug valve member.

Another object of the invention is to provide a plug valve member having a periphery which is a curved line whose sides are arcs of the same radius as the arc of the seat which is to receive the valve member while the ends are curves which merge the two side arcs together and are spaced apart on a diameter which is equal to the diameter of the bore of the valve housing less twice the tolerance or clearance for the valve.

Another object of the invention is to overlap the radii which strike the arcs for the sides of a plug valve member so that the valve has less width than length.

Another object of the invention is to overlap the radii which strike the arcs of the sides of a plug valve member for a distance which is substantially equal to four times the tolerance of the plug in the bore.

Still another object of the invention is to provide a plug member for plug valves which will have an arc on the side thereof so as to form a seat for a substantial area with a substantially identical arc in the seat.

Another object is to provide a plug member for plug valves which will have arcs on the sides to fit more precisely with the bore of the plug over the passage thru the valve by having the arcs struck on a radius which is offset from the center of the plug on a normal to the arcs of the passage thru the plug.

Another object of the invention is to provide a plug member having a curved periphery whose ends are arcs of the same diameter as the bore less twice the clearance while the arcs of the sides are identical with the arcs of the bore on identically the same radius, but wherein the radii are centered on opposite sides of the center of the plug, a distance which is substantially twice the clearance or tolerance of the plug in the bore.

Other and further objects of the invention will be readily apparent when the following description is considered in connection with the accompanying drawings wherein.

Figure 1:
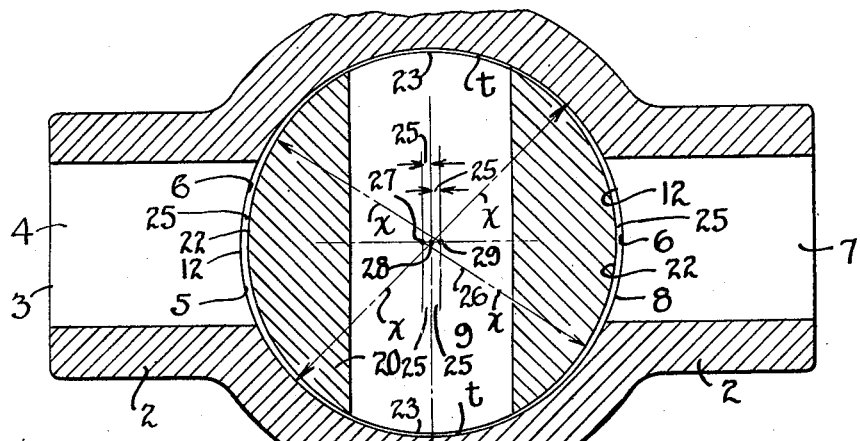
Fig. 1 is a transverse section through a plug valve housing and plug illustrating the plug in closed position and the curvature of the plug exaggerated to emphasize its configuration.

All of the figures in the drawings are merely diagrammatic omitting the details of construction, systems of lubrication, structures for operation, and connecting mechanisms. This invention is in the nature of correlating with the application of R. M. Garrison, Serial No. 406,338, filed Aug. 11, 1941, for an Oval plug valve chamber.

In Fig. 1 the valve housing is illustrated generally at 2 and has a passage 3 extending therethrough. This passage extends entirely through the valve and has a portion 4 at one end having a seating area 5 in the bore 6 of the housing, while the portion 7 has a seat 8 in the bore 6. The seats 5 and 8 are, of course, curved due to the fact that the circular bore 6 intercepts the horizontal passage 3.

The bore 6 is circular and in some instances it may be cylindrical or it may be frusto-conical or tapered as desired. The bore 6 may be considered as of a radius X.

Figure 5:
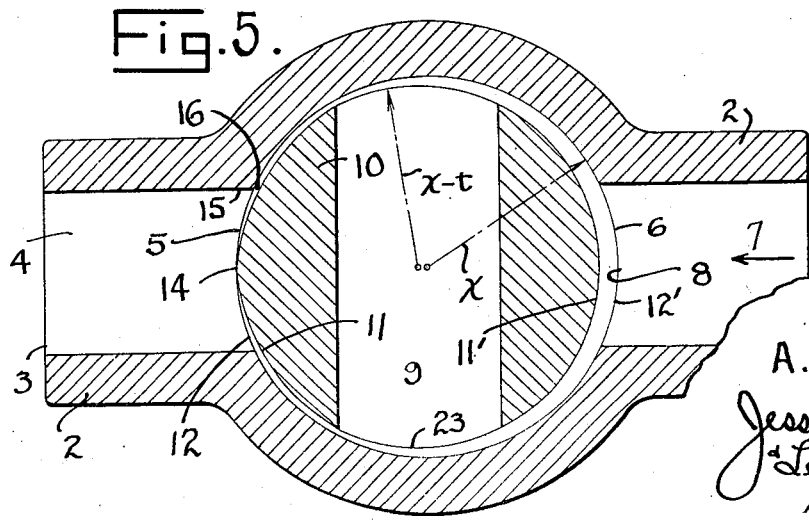
Fig. 5 is an exaggerated view illustrating a standard type of plug in position to show the line bearing and the divergence of the arc of the plug from the arc of the seat.

As seen in Fig. 5, the standard plug 10 is circular and of a radius which is equal to the radius X of the bore 6 less a distance which is equal to the tolerance $t$ or clearance which is provided between the plug and the bore. A passage extends across the plug to be aligned with the passage 3 when the valve is open.

In view of the fact that X minus $t$ is less than X it seems obvious that the arc 11 of the plug at the point 11′ is of different curvature than the arc 12 of the bore 6 at the point 12′. In view of the fact that when the pressure is applied from the portion 7 of the passage 3 that then the plug 10 will be moved to the left as viewed in Fig. 5, this movement will cause the arc 11 to move against the arc 12; and in view of the fact that the arc 11 is of a smaller radius than the arc 12 they will, as a matter of fact, contact only along a line bearing which will occur on the axis of the passage 3 at the vertical line such as 14. The arcs 11 and 12 will be seen in Fig. 5 to diverge as they depart to either side of the line 14, so that by the time they reach the edge 15 of the passage 3 they will have diverged a substantial distance. Due to this divergence an undesirable opening or space 16 occurs and due to the fact that this space is present it has been found difficult to maintain the lubrication features of a lubricated valve or to maintain a seal with other types of plug valve.

The invention therefore is to construct a plug member of a particular configuration so that the arc of the plug will fit the arc of the bore, not only along a line bearing such as 14 in Fig. 5, but over the entire area at least of a width of the seats 5 and 8 at each side.

Figure 2:
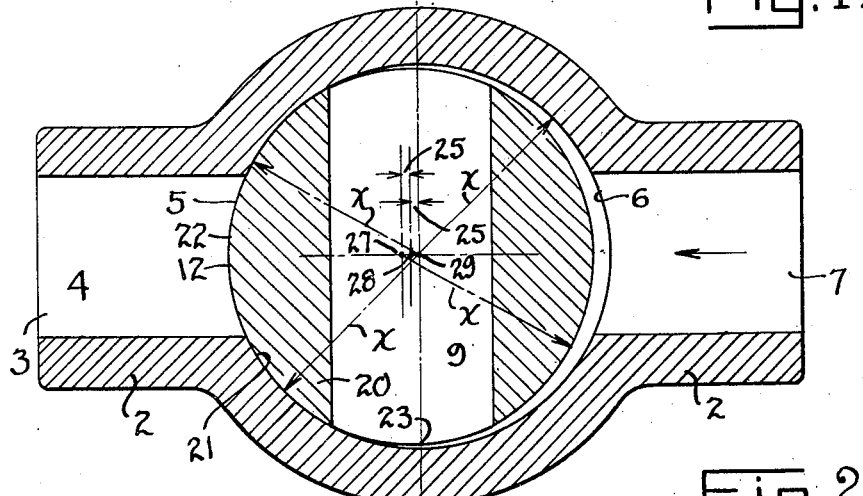
Fig. 2 is a view similar to Fig. 1 with the pressure applied from the righthand side to move the plug into seating position with the bore.
Figure 3:
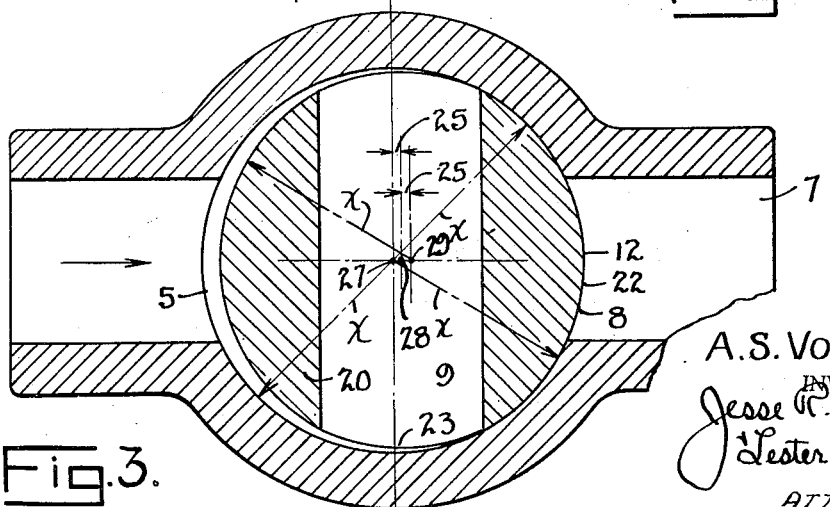
Fig. 3 is a view similar to Fig. 2 but with the pressure applied from the lefthand side.
Figure 4:
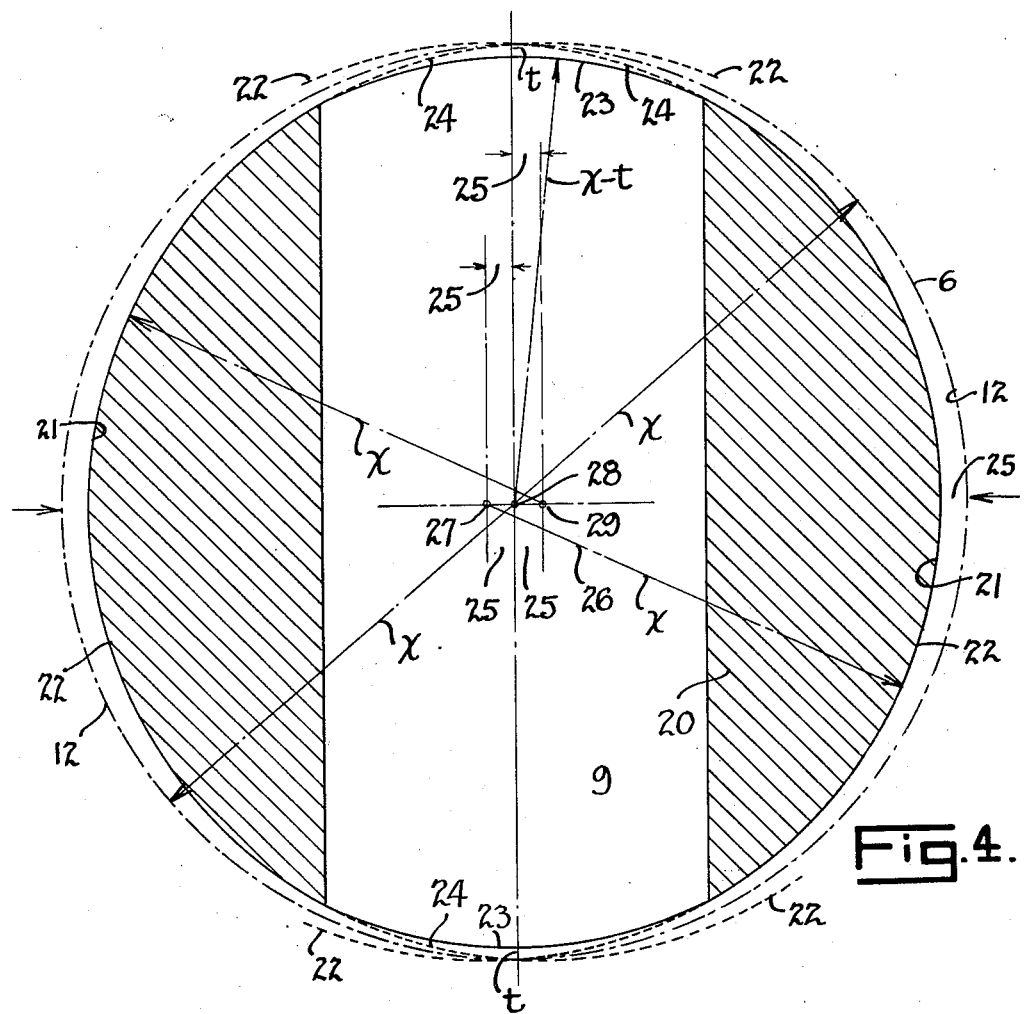
Fig. 4 is a diagrammatic view illustrating the manner of constructing the plug member with the curved periphery drawn to arcs of different radii.

Figs. 1 to 4, inclusive, show an arrangement of a plug member 20, which has been constructed with the sides 21 thereof on a curve or arc 22. This curve along the opposite sides, as seen in Fig. 4, is of a radius X, which is identically the same as the radius X of the bore 6 indicated in dotted lines in Fig. 4. In order, however, that the plug may have a clearance or tolerance $t$ to permit its turning within the bore 6, the arcs 22 are merged together at the ends 23 of the plug member by being cut away a distance $t$ shown by the dotted lines 24 as each arc approaches the end of the valve. In this manner the clearance $t$ is provided at the ends of the valves whereas a greater clearance or tolerance is provided at the sides of the valves and this distance or tolerance is indicated at 25 on the right hand side of Fig. 4.

This distance 25 is as a matter of fact substantially twice the distance of the tolerance $t$ and this distance is provided due to the fact that the radius X, indicated by the line 26 in Fig. 4 is centered at a point 27, which is offset a distance 25 or $2t$ to one side of the true center 28 of the plug 20. In this manner the side 21 is an arc which is identical with the arc 12 of the bore 6. The opposite side of the plug is also struck with a radius X from a center 29, which is also offset by a distance 25, which is subtsantially $2t$ and on the opposite side of the center 28 from the point 27 where the other side arc is centered. In other words, as is apparent from Fig. 4, the radii which strike the opposite arcs 22 are offset or overlapped at their centers.

The ends 23 of the plug are of a radius X the same as the bore 6 except that they have been ground off or cut away so as to merge the arcs 22 of the sides so that the actual distance from the center 28 to the end 23 is a distance X minus $t$, which is the radius of the bore less the tolerance or clearance to provide movement for the plug. The arc 22 where it extends beyond the center line of the passage 9 when the valve is closed is shown in dotted lines in Fig. 4.

It is apparent that the plug member is, therefore, slightly longer than it is wide and that the periphery is a curved line whose sides are arcs on a radius X and whose ends are eased off slightly to provide a curve which is of a radius X minus $t$. The plug could be said to be oval with the sides of the oval formed on an arc or curve of the same radius as the bore of the housing.

In the example just given the distance 25 has been defined as approximately $2t$ but it is to be understood that this distance may be varied as circumstances require, another illustration being that the distance 25 would equal the clearance or tolerance $t$ so that there would be points on the plug between the ends 23 and the middle of the sides which would have a clearance of $t$ minus where the side arc and the end arcs merge together.

In practice the plug 20 will fit symmetrically in the bore 6, as seen in Fig. 1, with a tolerance $t$ at the ends and a clearance substantially equal to $2t$ at the sides due to the fact that the sides are struck on the arcs 22 which are the same radius as the arcs 12 of the bore.

When pressure is applied from the righthand side thru the bore 7 of the passage 3, as seen in Fig. 2, then the plug 20 will shift slightly so that the arc 22 will fit precisely with the arc 12, because they are identical arcs. In this manner there will be a close fit between the periphery of the valve and the seat 5 of the portion 4 of the passage 3, and in this manner a seal will be maintained due to the fact that there is no divergence of the arcs 12 and 22. The only divergence of the arcs 12 and 22 occurs adjacent the ends of the passage 9 in the plug member where the plug has been eased off at the end to provide a clearance. This clearance allows the shifting of the valve so that the arcs 12 and 22 may coincide at least for a distance greater than the width of the portion 4 of the passage 3.

In Fig. 3 the pressure has been applied from the lefthand side or through the portion 4 of the passage 3 and the valve has shifted to form a seal with the seat 8.

The foregoing construction is believed to provide a solid plug for plug valves which obtains the advantages of a split type of plug where the plug is made in segments but it avoids the disadvantages of the cost of construction and of the necessity of forming a seal at the center of the split plug between the sections. It also has advantages in ease of operation and in handling.

Broadly the invention contemplates a plug for plug valves wherein the sealing faces of the plug member are stuck on an arc of the seat which it is to engage in providing a seal.

What is claimed is:

1. The combination of a ported plug valve housing and plug therefor, a plug receiving bore in said housing, a passage thru said housing which is intercepted by said bore, said bore being circular and of a radius $x$, said plug being substantially circular and having a passage therethru to be aligned with the passage in said housing, said plug passage extending laterally through said plug, imperforate areas on said plug each of which is formed on a radius $x$, the centers of said radii for the opposite areas being offset from the center of the plug toward the opposite area a distance equal to twice the clearance of the plug with the bore so that the arc of the plug where it seals the housing passage is of the same radius as the arc of the bore of the housing whereby greater sealing area between such arcs is obtained.

2. The combination of a ported plug valve housing and plug therefor, a plug receiving bore in said housing, a passage thru said housing which is intercepted by said bore, said bore being circular and of a radius $x$, said plug being substantially circular and having a passage therethru to be aligned with the passage in said housing, said plug passage extending laterally through said plug, imperforate areas on said plug each of which is formed on a radius $x$, the centers of said radii for the opposite areas being offset from the center of the plug toward the opposite area a distance equal to twice the clearance of the plug with the bore so that the arc of the plug where it seals the housing passage is of the same radius as the arc of the bore of the housing whereby greater sealing area between such arcs is obtained, the length of said plug along the passage being shortened to provide clearance with said bore.

3. The combination of a ported plug valve housing and plug therefor, a plug receiving bore in said housing, a passage thru said housing which is intercepted by said bore, said bore being circular and of a radius $x$, said plug being substantially circular and having a passage therethru to be aligned with the passage in said housing, said plug passage extending laterally through said plug, imperforate areas on said plug each of which is formed on a radius $x$, the centers of said radii for the opposite areas being offset from the center of the plug toward the opposite area a distance equal to twice the clearance of the plug with the bore so that the arc of the plug where it seals the housing passage is of the same radius as the arc of the bore of the housing whereby greater sealing area between such arcs is obtained, the length of said plug along the passage being shortened to provide clearance with said bore whereby the periphery of said plug is a curved line which is the diameter of the bore less twice the clearance in length and less four times the clearance in width.

4. A plug valve including a housing, a ported valve plug, a circular bore in said housing to rotatably receive said plug, said plug having imperforate portion thereon to seal with the bore where the valve passage enters and leaves the bore, said portions being curved on an arc of the same radius as the bore in said housing and the ported portions of said plug being reduced to provide a clearance for said plug in the bore.

5. A ported plug for plug valve housings having a circular bore comprising a plug member, a passage transversely thereof, said plug being substantially circular but having arcs forming its imperforate areas whose radii are the same as that of the valve bore, and whose ported areas are curves joining the side arcs which curves at the end are arcs of a radius equal to the radius of the bore less the amount of clearance of the plug in the bore.

6. A plug valve including a housing, a flow passage therethrough, a circular bore therein, a rotatable oval ported plug having a clearance in said bore, imperforate portion between the ports, said portions being arcs of a circle of the same radius as the bore of the housing with the ported portions of the oval of slightly less radius to allow slight shifting of the plug so that the downstream side of the oval seats precisely with the bore surface around the flow passage.

ALEXANDER S. VOLPIN.